United States Patent
Wang et al.

(10) Patent No.: US 10,878,612 B2
(45) Date of Patent: Dec. 29, 2020

(54) FACIAL IMAGE REPLACEMENT USING 3-DIMENSIONAL MODELLING TECHNIQUES

(71) Applicant: INTEL CORPORATION, Santa Clara, CA (US)

(72) Inventors: Shandong Wang, Beijing (CN); Ming Lu, Beijing (CN); Anbang Yao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/474,878

(22) PCT Filed: Apr. 4, 2017

(86) PCT No.: PCT/CN2017/079401
§ 371 (c)(1),
(2) Date: Jun. 28, 2019

(87) PCT Pub. No.: WO2018/184140
PCT Pub. Date: Oct. 11, 2018

(65) Prior Publication Data
US 2020/0013212 A1    Jan. 9, 2020

(51) Int. Cl.
*G06T 15/04* (2011.01)
*G06T 13/40* (2011.01)
*G06T 15/50* (2011.01)

(52) U.S. Cl.
CPC .............. *G06T 15/04* (2013.01); *G06T 13/40* (2013.01); *G06T 15/506* (2013.01)

(58) Field of Classification Search
None
See application file for complete search history.

(56) References Cited

U.S. PATENT DOCUMENTS

| 2007/0031028 A1* | 2/2007 | Vetter | G06K 9/00208 |
| | | | 382/154 |
| 2007/0237421 A1* | 10/2007 | Luo | G06T 11/60 |
| | | | 382/284 |

(Continued)

FOREIGN PATENT DOCUMENTS

WO    2018184140    10/2018

OTHER PUBLICATIONS

International Preliminary Report on Patentability and Written Opinion of the International Searching Authority for International Patent Application PCT/CN2017/079401, dated Oct. 17, 2019, 5 pages.

(Continued)

*Primary Examiner* — Jeffrey J Chow
(74) *Attorney, Agent, or Firm* — Finch & Maloney PLLC

(57) ABSTRACT

Techniques are provided for facial image replacement between a reference facial image and a target facial image, of varying pose and illumination, using 3-dimensional morphable face models (3DMMs). A methodology implementing the techniques according to an embodiment includes fitting the reference face and the target face to a first and second 3DMM, respectively. The method further includes generating a texture map based on the fitted 3D reference face and rendering the fitted 3D reference face to a pose of the fitted 3D target face. The rendering is based on parameters of the first 3DMM, parameters of the second 3DMM, and the generated texture map associated with the fitted 3D reference face. The method further includes, determining a region of interest of the target facial image; and blending the rendered 3D reference face onto the region of interest of the target facial image to generate a replaced facial image.

20 Claims, 7 Drawing Sheets

Reference Face Image 110 | 3D Shape Fitting Result 210 | Skin Albedo Fitting Result 220 | Fitted Reference Face 130

Target Face Image 120 | 3D Shape Fitting Result 230 | Skin Albedo Fitting Result 240 | Fitted Target Face 140

(56) References Cited

U.S. PATENT DOCUMENTS

| | | | |
|---|---|---|---|
| 2013/0129141 A1 | 5/2013 | Wang et al. | |
| 2017/0084068 A1* | 3/2017 | Son | G06T 15/506 |
| 2017/0140236 A1* | 5/2017 | Price | G06K 9/4628 |
| 2018/0046854 A1* | 2/2018 | Kittler | G06T 7/344 |
| 2018/0068178 A1* | 3/2018 | Theobalt | G06K 9/00315 |
| 2019/0228556 A1 | 7/2019 | Wang et al. | |
| 2019/0279347 A1* | 9/2019 | Hayasaka | G06T 11/00 |
| 2019/0286884 A1* | 9/2019 | Rhee | G06T 15/04 |

OTHER PUBLICATIONS

"Face Swapping: Automatically Replacing Faces in Photographs", retrieved from the Internet: http://www1.cs.columbia.edu/CAVE/projects/face_replace/ [copy retrieved Feb. 24, 2017], 3 pages.
Garrido, P et al., "Automatic Face Reenactment", Graphics, Vision & Video, CVPR 2014, 2 pages.
Blanz, V. et al., "Exchanging Faces in Images", Eurographics 2004, 2004, vol. 23, 8 pages.
Dale, K. et al., "Video Face Replacement", GVI Group Harvard University, retrieved from the Internet: http://gvi.seas.harvard.edu/paper/video-face-replacement [copy retrieved Feb. 24, 2017], 2 pages.
Ramamoorthi, R. et al., "A Signal-Processing Framework for Inverse Rendering", retrieved from the Internet: https://graphics.stanford.edu/papers/invrend/ [copy retrieved Feb. 24, 2017], 4 pages.
Perez, P. et al., "Poisson Image Editing", ACM, 2003, pp. 313-318.
Shu, Z. et al., "EyeOpener: Editing Eyes in the Wild", retrieved from the Internet: http://www3.cs.stonybrook.edu/~cvl/content/eyeopener/eyeopener.html [copy retrieved Feb. 24, 2017], 2 pages.
Sunkavalli, K. et al., "Multi-scale Image Harmonization", SIGGRAPH, 2010, 2 pages.
Yang, F. et al., "Expression Flow for 3D-Aware Face Component Transfer", ACM SIGGRAPH 2011, 2011, 2 pages.
International Search Report for International Patent Application PCT/CN2017/079401, dated Dec. 28, 2017, 4 pages.
Written Opinion of the International Searching Authority for International Patent Application PCT/CN20171079401, completed Dec. 25, 2017, 4 pages.

* cited by examiner

Reference
Face Image
110

Normal Map
after fitting
310

Illumination
Removal
320

Extracted
Texture Map
330

Skin Albedo
Map
340

Texture Map
150

Replaced
Facial
Image
170

FACIAL IMAGE REPLACEMENT USING 3-DIMENSIONAL MODELLING TECHNIQUES

BACKGROUND

Facial image replacement systems generally provide the capability for a user to substitute a selected face in a target image with a different face chosen from a reference image. Existing systems, however, which often rely on 2-dimensional warping techniques, are unable to perform facial substitution in a manner that produces a convincing and realistic result, particularly when the target and reference faces are presented in different poses and/or different illumination conditions. Additionally, existing systems tend to introduce undesirable visual artifacts in the composite result.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
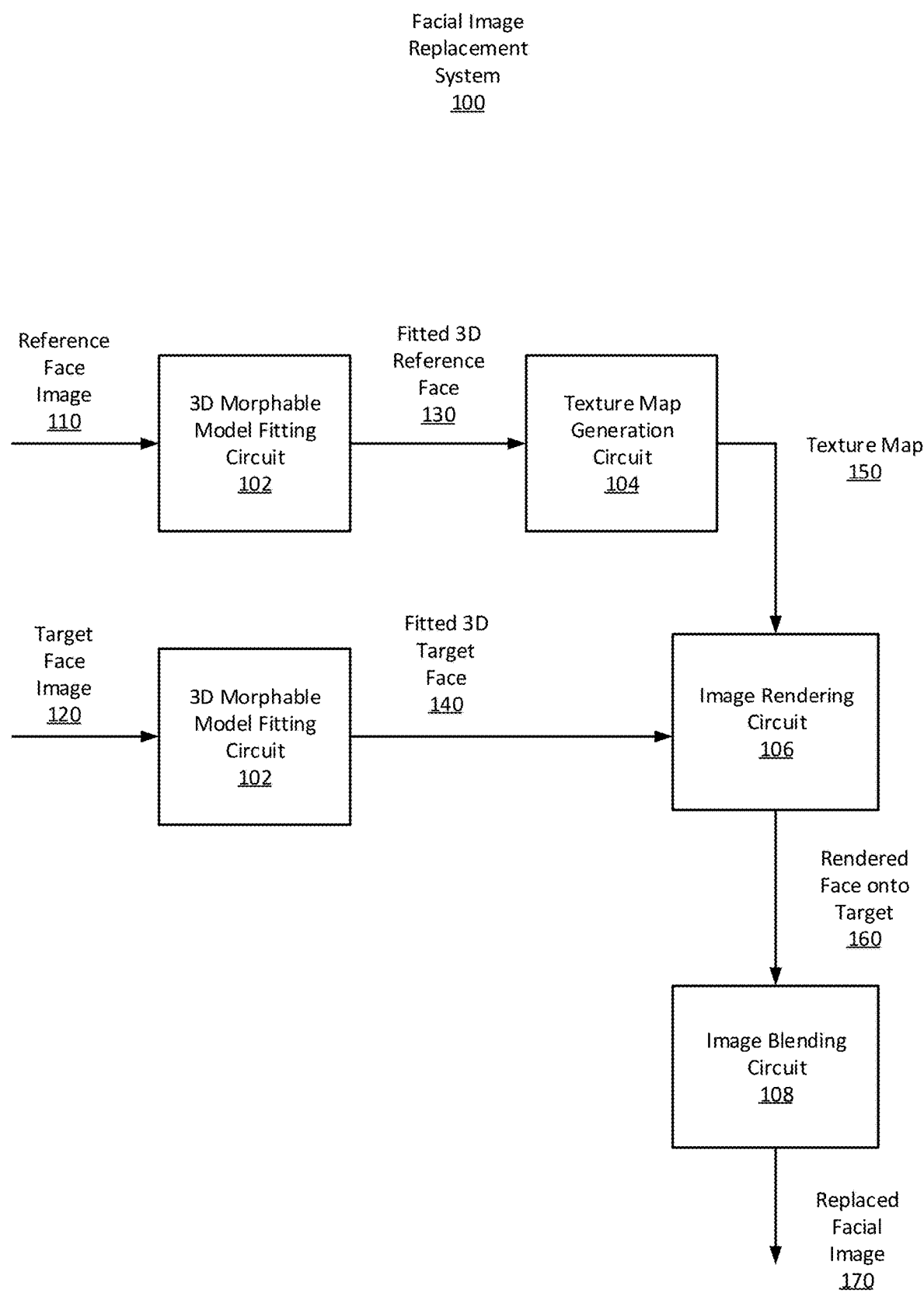
FIG. 1 is a block diagram of a facial image replacement system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for facial image replacement between a desired reference facial image and a target facial image that is to be replaced, using 3-dimensional morphable face models (3DMMs). The techniques allow for recovery of illumination and pose of the target facial image, into the reference (replacement) facial image. The disclosed techniques provide convincing and realistic composite image results, even though the reference facial image and target facial image may differ significantly in pose and illumination. Facial image replacement is a useful tool in the field of digital photography and can also be used for privacy protection, entertainment and games, personalized avatar creation, and virtual reality applications including virtual make-up and virtual try-on shopping experiences.

The disclosed techniques can be implemented, for example, in a computing system or a software product executable or otherwise controllable by such systems, although other embodiments will be apparent. The system or product is configured to provide improved facial image replacement. In accordance with an embodiment, a methodology to implement these techniques includes fitting a reference facial image to a first 3-dimensional morphable model (3DMM) to generate a fitted 3-dimensional (3D) reference face. The 3DMM includes parameters representing 3D shape data, illumination, and pose. The method also includes fitting a target facial image to a second 3DMM to generate a fitted 3D target face. The method further includes generating a texture map based on the fitted 3D reference face, and rendering the fitted 3D reference face to a pose of the fitted 3D target face. The rendering is based on the parameters of the first 3DMM, the parameters of the second 3DMM, and the generated texture map associated with the fitted 3D reference face. A region of interest of the target facial image may then be determined and the 3D reference face is blended onto that region to generate a replaced facial image.

As will be appreciated, the techniques described herein may allow for improved facial image replacement, particularly when the reference and target faces are in presented different pose and illumination, compared to existing methods that rely on 2-dimensional image warping techniques. The disclosed techniques can be implemented on a broad range of platforms including laptops, tablets, smart phones, workstations, and imaging devices. These techniques may further be implemented in hardware or software or a combination thereof. Note that reference herein to facial image replacement includes the modification of a reference image, and that full image replacement is not needed. To this end, any region of interest of a given face in a given reference image can be modified or otherwise updated to include one or more replacement facial features.

FIG. 1 is a block diagram of a facial image replacement system 100, configured in accordance with certain embodiments of the present disclosure. The facial image replacement system 100 is shown to include a 3D morphable model fitting circuit 102, a texture map generation circuit 104, an image rendering circuit 106, and an image blending circuit 108.

The 3D morphable model fitting circuit 102 is configured to fit a reference facial image 110 to a first 3-dimensional morphable model (3DMM) to generate a fitted 3D reference face 130. In some embodiments, the 3DMM includes parameters representing 3D shape data, illumination, pose (e.g., rotation and translation), albedo parameters and perspective camera model parameters. The 3D morphable model fitting circuit 102 is also configured to fit a target facial image 120 to a second 3DMM to generate a fitted 3D target face 140. The target facial image is to be replaced by the reference facial image. In some embodiments, the fitting may include calculating values of the 3DMM parameters based on an unconstrained energy minimization process to match the reference facial image 110 to the fitted 3D reference face 130, and to match the target facial image 120 to the fitted 3D target face 140. In some embodiments, the 3DMM fitting may further incorporate delta expression blend-shapes to model facial expressions and spherical harmonic basis functions to approximate global illumination. In some embodiments, fitting may be achieved using other known techniques, in light of the present disclosure.

The texture map generation circuit 104 is configured to generate a texture map 150 based on the fitted 3D reference face 130. In some embodiments, the texture map generation circuit 104 is further configured to remove illumination from the reference facial image 110 based on the illumination parameter of the first 3DMM. In some embodiments, the texture map generation circuit 104 is further configured to fill in occluded regions of the texture map 150 using a Poisson image editing process. Occluded regions may result, for example, from the presence of hair, accessories, or hand-to-face gestures in the reference or target images.

The image rendering circuit 106 is configured to render the fitted 3D reference face 130 to a pose of the fitted 3D target face 140. In some embodiments, the rendering is based on the parameters of the first 3DMM, the parameters of the second 3DMM, and the generated texture map 150 associated with the fitted 3D reference face. In some embodiments, rendering may be achieved using known techniques, in light of the present disclosure.

The image blending circuit 108 is configured to blend the rendered 3D reference face 160 onto a determined region of interest of the target facial image 120 to generate a replaced facial image 170. In some embodiments, the blending may employ a gradient domain fusion blending process, after local color adjustment techniques are applied to harmonize differences in skin tone and local contrast between the reference and target. In some embodiments, the image blending circuit 108 is further configured to determine the region of interest of the target facial image 120, for example, based on a graph cut boundary optimization process and inner facial landmarks. In some embodiments, blending may be achieved using known techniques, in light of the present disclosure.

Figure 2:
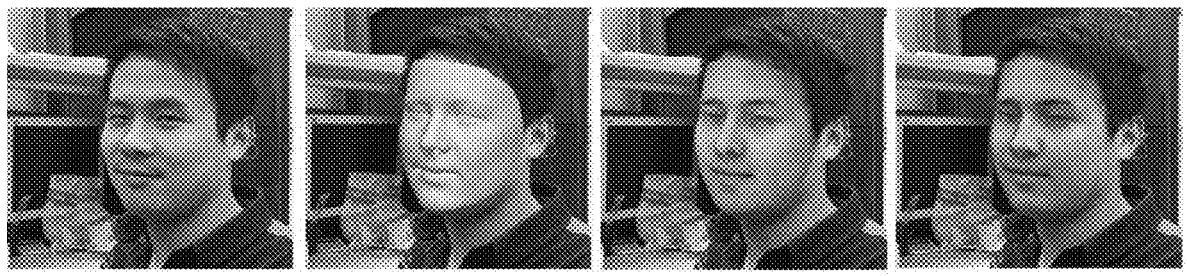
FIG. 2 illustrates reference and target facial images, in accordance with certain embodiments of the present disclosure.
Figure 2:
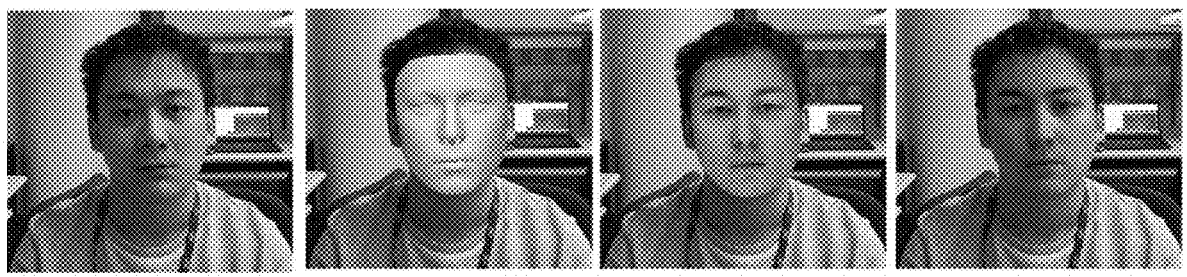

FIG. 2 illustrates reference and target facial images, in accordance with certain embodiments of the present disclosure. On the top row, the reference face image 110 is shown, along with the 3D shape fitting result 210. Intermediate results of the 3DMM fitting process are also shown as the skin albedo fitting result 220 and the fitted reference face 130. On the bottom row, the target face image 120 is shown, along with the 3D shape fitting result 230. Here again, intermediate results of the 3DMM fitting process are also shown as the skin albedo fitting result 240, and the fitted target face 140.

Figure 3:
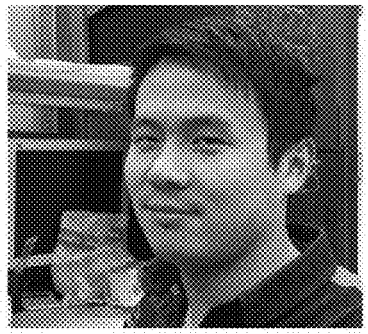
FIG. 3 illustrates processed images, in accordance with certain embodiments of the present disclosure.
Figure 3:
Figure 3:
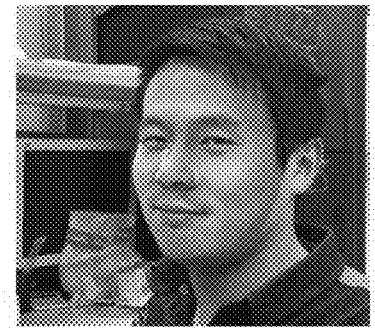
Figure 3:
Figure 3:
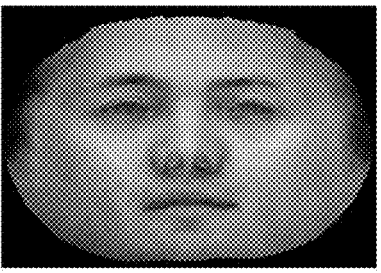
Figure 3:
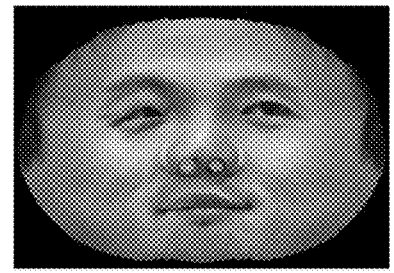

FIG. 3 illustrates processed images associated with the texture mapping process, in accordance with certain embodiments of the present disclosure. Here, the reference face image 110 is shown as the starting point. Next, a map of the normal vectors to the surface 310 is shown. The normal map is based on the 3D reconstructed shape from the 3DMM model fitting process. The results of illumination removal are shown as 320. The texture map 330, extracted or based on image 320, is shown with occluded regions represented by white. The skin albedo map 340 may be used to aid in the process of filling in the occluded regions of the extracted texture map 330. The resulting completed texture map is shown as 150. The texture map 150 is intended to preserve the details of the facial appearance by remapping the face to a 2D representation (e.g., a 2D mesh), using known mesh parameterization algorithms, in light of the present disclosure. There will typically exist a correspondence between vertices of the 2D mesh and the pixel colors in the facial image. The normal map 310 allows for removal of the illumination associated with image colors through division of the color values by the estimated lighting to achieve the illumination independent facial image 320.

Figure 4:
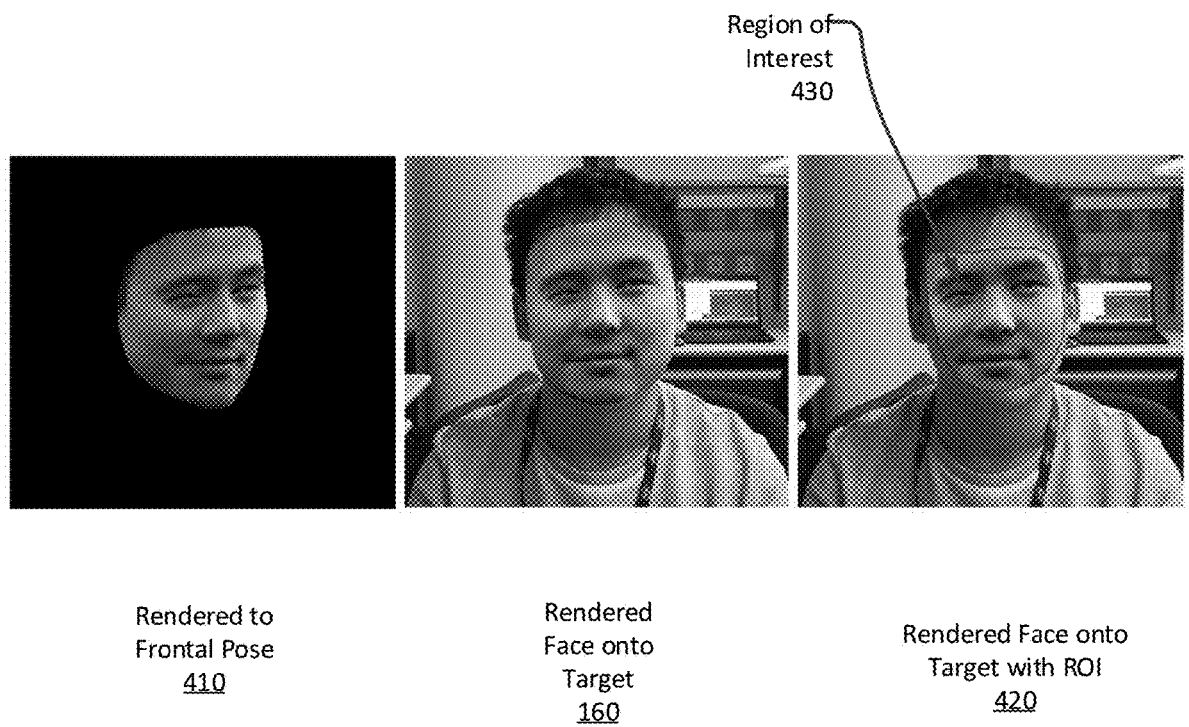
FIG. 4 illustrates additional processed images, in accordance with certain embodiments of the present disclosure.
Figure 5:
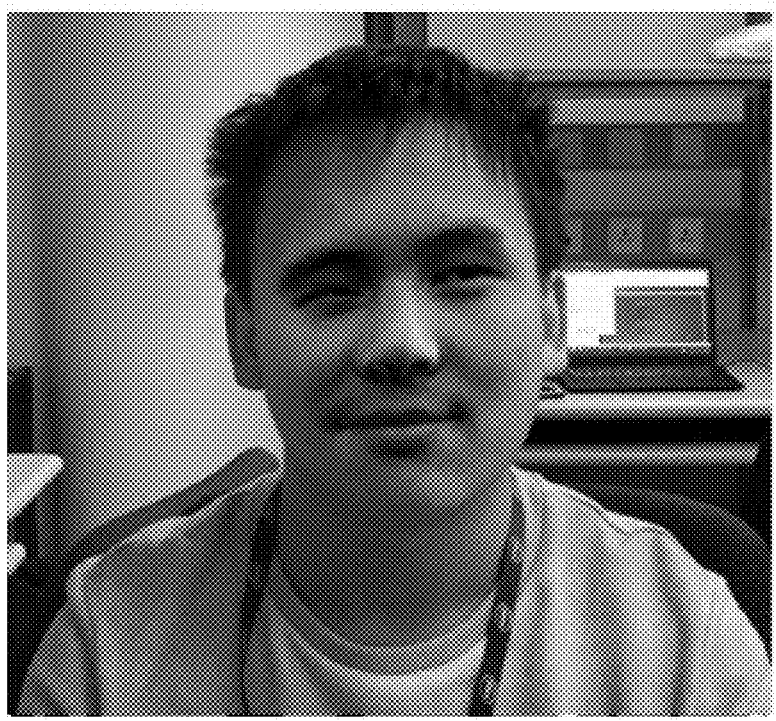
FIG. 5 illustrates a replaced facial image result, in accordance with certain embodiments of the present disclosure.

FIG. 4 illustrates additional processed images, in accordance with certain embodiments of the present disclosure. The fitted 3D reference face is shown rendered to a frontal pose 410. The reference face rendered onto the target is shown 160. The reference face rendered onto the region of interest 430 of the target is shown 420. FIG. 5 illustrates a replaced facial image result 170, in accordance with certain embodiments of the present disclosure.

Methodology

Figure 6:
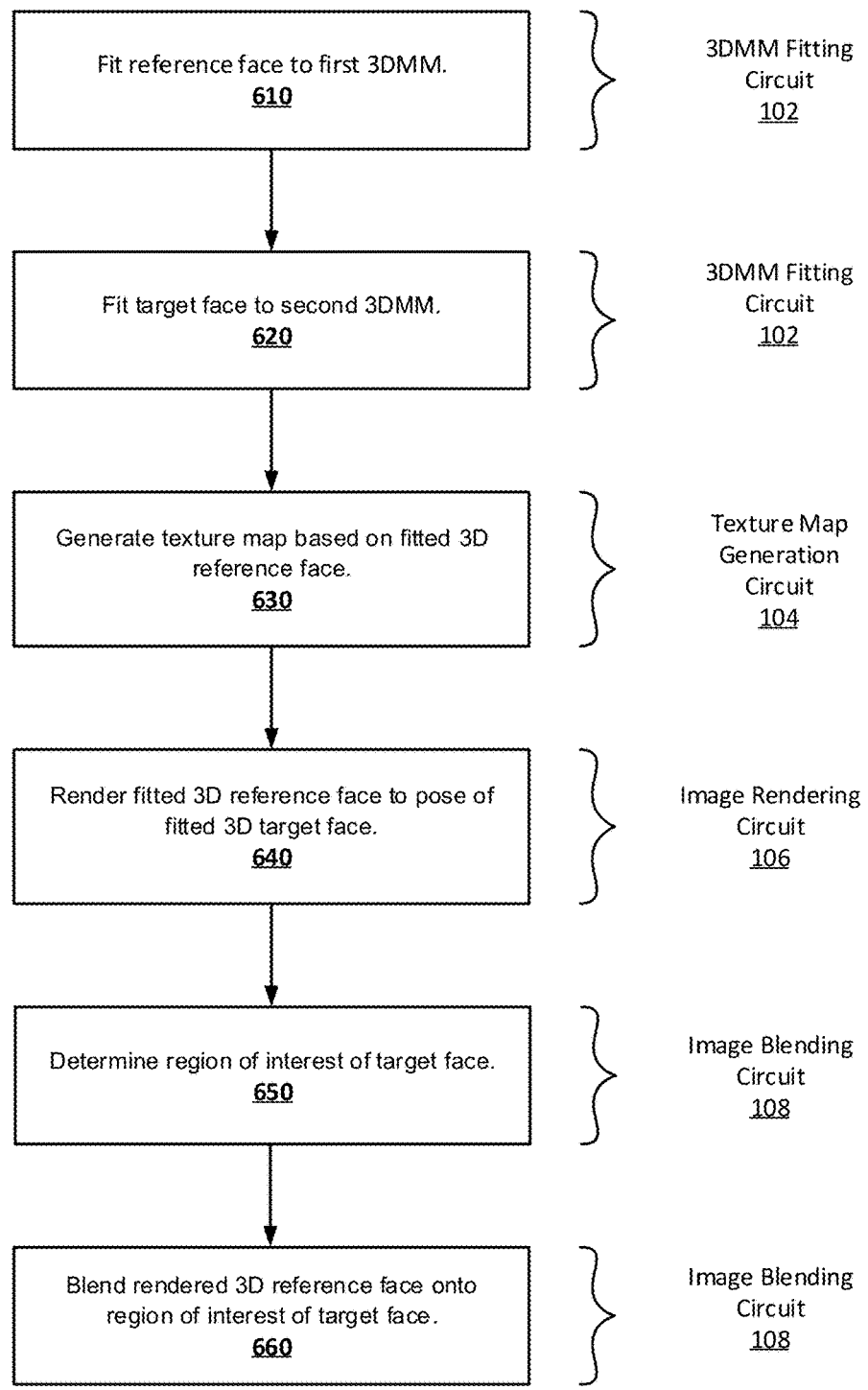
FIG. 6 is a flowchart illustrating a methodology for facial image replacement, in accordance with certain embodiments of the present disclosure.

FIG. 6 is a flowchart illustrating a methodology 600 for facial image replacement, in accordance with certain embodiments of the present disclosure. As can be seen, the example methods include a number of phases and sub-processes, the sequence of which may vary from one embodiment to another. However, when considered in the aggregate, these phases and sub-processes form a process for facial image replacement in accordance with certain of the embodiments disclosed herein. These embodiments can be implemented, for example using the system architecture illustrated in FIG. 1 as described above. However other system architectures can be used in other embodiments, as will be apparent in light of this disclosure. To this end, the correlation of the various functions shown in FIG. 6 to the specific components illustrated in the other figure is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 600. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 6, in an embodiment, method 600 for facial image replacement commences by fitting, at operation 610, a reference facial image to a first 3-dimensional morphable model (3DMM) to generate a fitted 3D reference face. In some embodiments, the 3DMM includes parameters representing 3D shape data, illumination, pose, albedo parameters and perspective camera model parameters. Next at operation 620, a target facial image is fitted to a second 3DMM to generate a fitted 3D target face. In some embodiments, the fitting may include calculating values of the 3DMM parameters based on an unconstrained energy minimization process to match the reference facial image to the fitted 3D reference face, and to match the target facial image to the fitted 3D target face.

At operation 630, a texture map is generated based on the fitted 3D reference face. In some embodiments, the texture map generation further includes removing illumination from the reference facial image based on the illumination parameter of the first 3DMM.

At operation 640, the fitted 3D reference face is rendered to a pose of the fitted 3D target face. In some embodiments, the rendering is based on the parameters of the first 3DMM, the parameters of the second 3DMM, and the generated texture map associated with the fitted 3D reference face.

At operation 650, a region of interest of the target facial image is determined. In some embodiments, the region of interest may be determined based on a graph cut boundary optimization process.

At operation 660, the rendered 3D reference face is blended onto the region of interest of the target facial image to generate a replaced facial image. In some embodiments, the blending is based on a gradient domain fusion process.

Of course, in some embodiments, additional operations may be performed, as previously described in connection with the system. For example, occluded regions of the texture map may be filled in using a Poisson image editing process. In some further embodiments, the replaced facial image may be provided to a digital photography application, a personalized avatar creation tool, a privacy protection application, an entertainment application, and/or a virtual reality application.

Example System

Figure 7:
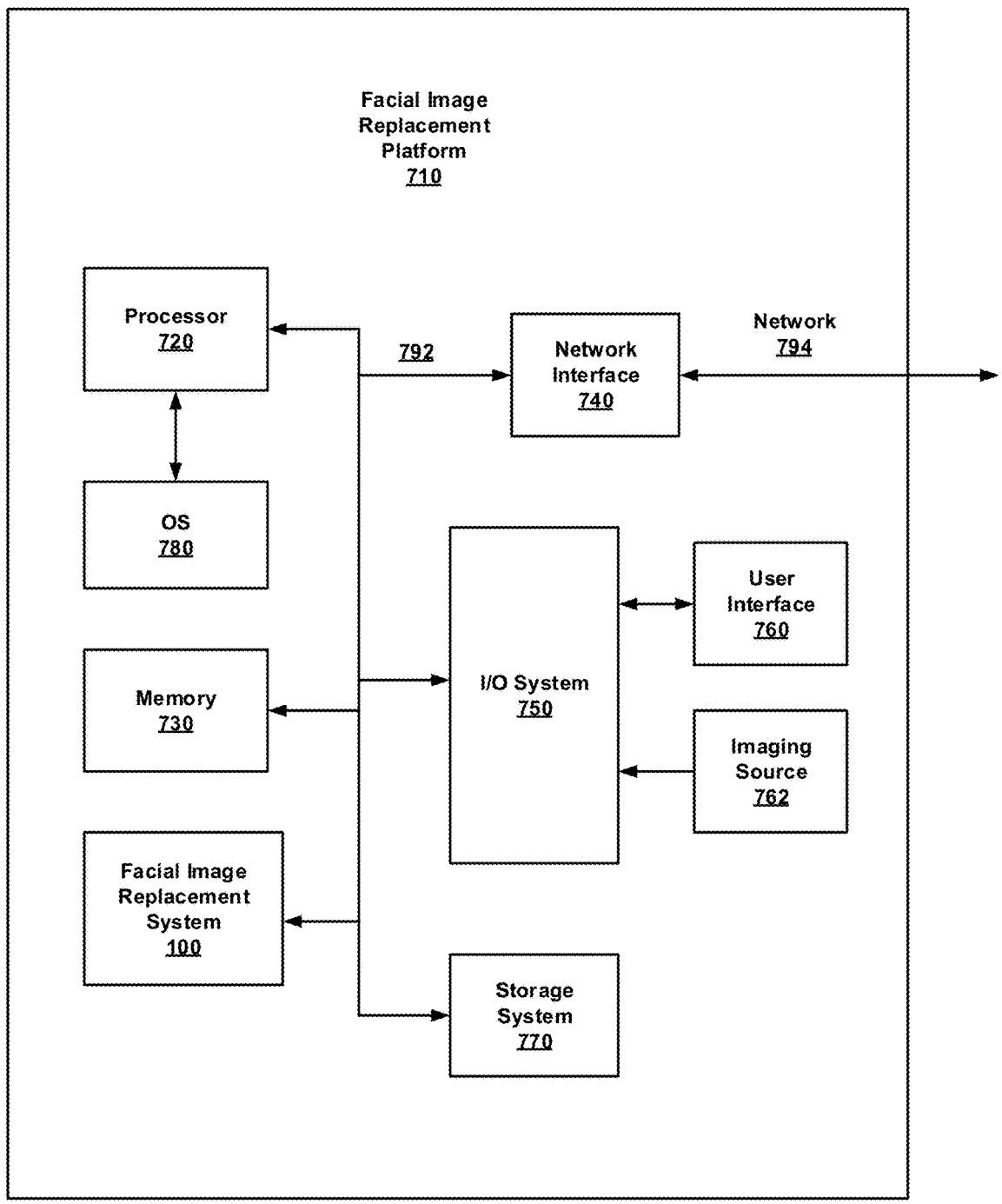
FIG. 7 is a block diagram schematically illustrating a platform to perform facial image replacement, configured in accordance with certain embodiments of the present disclosure.

FIG. 7 illustrates an example system 700 to perform facial image replacement, configured in accordance with certain embodiments of the present disclosure. In some embodiments, system 700 comprises a facial image replacement platform 710 which may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, and so forth. Any combination of different devices may be used in certain embodiments.

In some embodiments, platform 710 may comprise any combination of a processor 720, a memory 730, facial image replacement system 100, a network interface 740, an input/output (I/O) system 750, a user interface 760, an imaging source 762, and a storage system 770. As can be further seen, a bus and/or interconnect 792 is also provided to allow for communication between the various components listed above and/or other components not shown. Platform 710 can be coupled to a network 794 through network interface 740 to allow for communications with other computing devices, platforms, or resources. Other componentry and functionality not reflected in the block diagram of FIG. 7 will be apparent in light of this disclosure, and it will be appreciated that other embodiments are not limited to any particular hardware configuration.

Processor 720 can be any suitable processor, and may include one or more coprocessors or controllers, such as an audio processor or a graphics processing unit to assist in control and processing operations associated with system 700. In some embodiments, the processor 720 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 720 may be implemented as a complex instruction set computer (CISC) or a reduced instruction set computer (RISC) processor. In some embodiments, processor 720 may be configured as an x86 instruction set compatible processor.

Memory 730 can be implemented using any suitable type of digital storage including, for example, flash memory and/or random access memory (RAM). In some embodiments, the memory 730 may include various layers of memory hierarchy and/or memory caches as are known to those of skill in the art. Memory 730 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 770 may comprise technology to increase the storage performance enhanced protection for valuable digital media when multiple hard drives are included.

Processor 720 may be configured to execute an Operating System (OS) 780 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 700, and therefore may also be implemented using any suitable existing or subsequently-developed platform.

Network interface circuit 740 can be any appropriate network chip or chipset which allows for wired and/or wireless connection between other components of computer system 700 and/or network 794, thereby enabling system 700 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of computer system 700. I/O devices may include, but not be limited to, user interface 760, and an imaging source 762. User interface 760 may include devices (not shown) such as a display element, touchpad, keyboard, mouse, microphone, and speaker, etc. Imaging source 762 may be a camera, a scanner, a database of images, or any other suitable source. I/O system 750 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 720 or any chipset of platform 710.

It will be appreciated that in some embodiments, the various components of the system 700 may be combined or integrated in a system-on-a-chip (SoC) architecture. In some embodiments, the components may be hardware components, firmware components, software components or any suitable combination of hardware, firmware or software.

Facial image replacement system 100 is configured to provide the capability for facial image replacement between a reference facial image and a target facial image using 3-dimensional morphable face models (3DMMs), as described previously. The reference facial image and target facial image may vary in pose and illumination. Facial image replacement system 100 may include any or all of the circuits/components illustrated in FIG. 1, as described above. These components can be implemented or otherwise used in conjunction with a variety of suitable software and/or hardware that is coupled to or that otherwise forms a part of platform 710. These components can additionally or alternatively be implemented or otherwise used in conjunction with user I/O devices that are capable of providing information to, and receiving information and commands from, a user.

In some embodiments, these circuits may be installed local to system 700, as shown in the example embodiment of FIG. 7. Alternatively, system 700 can be implemented in a client-server arrangement wherein at least some functionality associated with these circuits is provided to system 700 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments, the server can be local to network 794 or remotely coupled to network 794 by one or more other networks and/or communication channels. In some cases, access to resources on a given network or computing system may require credentials such as usernames, passwords, and/or compliance with any other suitable security mechanism.

In various embodiments, system 700 may be implemented as a wireless system, a wired system, or a combination of both. When implemented as a wireless system, system 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the image replacement methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. In other embodiments, the functionalities disclosed herein can be incorporated into other software applications, such as image perception systems, robotics, and virtual reality applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry." as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc.

Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for facial image replacement. The method comprises: fitting, by a processor-based system, a reference facial image to a first 3-dimensional morphable model (3DMM) to generate a fitted 3D reference face, wherein the 3DMM includes parameters representing 3D shape data, illumination, and pose; fitting, by the processor-based system, a target facial image to a second 3DMM to generate a fitted 3D target face; generating, by the processor-based system, a texture map based on the fitted 3D reference face; rendering, by the processor-based system, the fitted 3D reference face to a pose of the fitted 3D target face, the rendering based on the parameters of the first 3DMM, the parameters of the second 3DMM, and the generated texture map associated with the fitted 3D reference face; determining, by the processor-based system, a region of interest of the target facial image; and blending, by the processor-based system, the rendered 3D reference face onto the region of interest of the target facial image to generate a replaced facial image.

Example 2 includes the subject matter of Example 1, wherein the 3DMM further includes albedo parameters and perspective camera model parameters.

Example 3 includes the subject matter of Examples 1 or 2, wherein the fitting comprises calculating values of the 3DMM parameters based on an unconstrained energy minimization process to match the reference facial image to the fitted 3D reference face, and to match the target facial image to the fitted 3D target face.

Example 4 includes the subject matter of any of Examples 1-3, wherein the texture map generation further comprises removing illumination from the reference facial image based on the illumination parameter of the first 3DMM.

Example 5 includes the subject matter of any of Examples 1-4, further comprising filling in occluded regions of the texture map using a Poisson image editing process.

Example 6 includes the subject matter of any of Examples 1-5, wherein the region of interest determination is based on a graph cut boundary optimization process.

Example 7 includes the subject matter of any of Examples 1-6, wherein the blending is based on a gradient domain fusion process.

Example 8 includes the subject matter of any of Examples 1-7, further comprising providing the replaced facial image to at least one of a digital photography application, personalized avatar creation tool, a privacy protection application, an entertainment application, and a virtual reality application.

Example 9 is a system for facial image replacement. The system comprises: a 3-dimensional morphable model (3DMM) fitting circuit to fit a reference facial image to a first 3-dimensional morphable model (3DMM) to generate a fitted 3D reference face, wherein the 3DMM includes parameters representing 3D shape data, illumination, and pose, the 3DMM fitting circuit further to fit a target facial image to a second 3DMM to generate a fitted 3D target face; a texture map generation circuit to generate a texture map based on the fitted 3D reference face; an image rendering circuit to render the fitted 3D reference face to a pose of the fitted 3D target face, the rendering based on the parameters of the first 3DMM, the parameters of the second 3DMM, and the generated texture map associated with the fitted 3D reference face, and an image blending circuit to blend the rendered 3D reference face onto a determined region of interest of the target facial image to generate a replaced facial image.

Example 10 includes the subject matter of Example 9, wherein the 3DMM further includes albedo parameters and perspective camera model parameters.

Example 11 includes the subject matter of Examples 9 or 10, wherein the 3DMM fitting circuit is further to calculate values of the 3DMM parameters based on an unconstrained energy minimization process to match the reference facial image to the fitted 3D reference face, and to match the target facial image to the fitted 3D target face.

Example 12 includes the subject matter of any of Examples 9-11, wherein the texture map generation circuit is further to remove illumination from the reference facial image based on the illumination parameter of the first 3DMM.

Example 13 includes the subject matter of any of Examples 9-12, wherein the texture map generation circuit is further to fill in occluded regions of the texture map using a Poisson image editing process.

Example 14 includes the subject matter of any of Examples 9-13, wherein the image blending circuit is further to determine the region of interest based on a graph cut boundary optimization process.

Example 15 includes the subject matter of any of Examples 9-14, wherein the image blending circuit is further to employ a gradient domain fusion process to perform the blending.

Example 16 includes the subject matter of any of Examples 9-15, wherein the replaced facial image is provided to at least one of a digital photography application, a privacy protection application, an entertainment application, and a virtual reality application.

Example 17 is at least one non-transitory computer readable storage medium having instructions encoded thereon that, when executed by one or more processors, result in the following operations for facial image replacement. The operations comprise: fitting a reference facial image to a first 3-dimensional morphable model (3DMM) to generate a fitted 3D reference face, wherein the 3DMM includes parameters representing 3D shape data, illumination, and pose; fitting a target facial image to a second 3DMM to generate a fitted 3D target face; generating a texture map based on the fitted 3D reference facet rendering the fitted 3D reference face to a pose of the fitted 3D target face, the rendering based on the parameters of the first 3DMM, the parameters of the second 3DMM, and the generated texture map associated with the fitted 3D reference face; determining a region of interest of the target facial image; and blending the rendered 3D reference face onto the region of interest of the target facial image to generate a replaced facial image.

Example 18 includes the subject matter of Example 17, wherein the 3DMM further includes albedo parameters and perspective camera model parameters.

Example 19 includes the subject matter of Examples 17 or 18, wherein the fitting comprises the operation of calculating values of the 3DMM parameters based on an unconstrained energy minimization process to match the reference facial image to the fitted 3D reference face, and to match the target facial image to the fitted 3D target face.

Example 20 includes the subject matter of any of Examples 17-19, wherein the texture map generation further comprises the operation of removing illumination from the reference facial image based on the illumination parameter of the first 3DMM.

Example 21 includes the subject matter of any of Examples 17-20, further comprising the operation of filling in occluded regions of the texture map using a Poisson image editing process.

Example 22 includes the subject matter of any of Examples 17-21, wherein the region of interest determination is based on a graph cut boundary optimization process.

Example 23 includes the subject matter of any of Examples 17-22, wherein the blending is based on a gradient domain fusion process.

Example 24 includes the subject matter of any of Examples 17-23, further comprising the operation of providing the replaced facial image to at least one of a digital photography application, a privacy protection application, an entertainment application, and a virtual reality application.

Example 25 is a system for facial image replacement, the system comprises: means for fitting a reference facial image to a first 3-dimensional morphable model (3DMM) to generate a fitted 3D reference face, wherein the 3DMM includes parameters representing 3D shape data, illumination, and pose; means for fitting a target facial image to a second 3DMM to generate a fitted 3D target face; means for generating a texture map based on the fitted 3D reference face; means for rendering the fitted 3D reference face to a pose of the fitted 3D target face, the rendering based on the parameters of the first 3DMM, the parameters of the second 3DMM, and the generated texture map associated with the fitted 3D reference face; means for determining a region of interest of the target facial image; and means for blending the rendered 3D reference face onto the region of interest of the target facial image to generate a replaced facial image.

Example 26 includes the subject matter of Example 25, wherein the 3DMM further includes albedo parameters and perspective camera model parameters.

Example 27 includes the subject matter of Examples 25 or 26, wherein the fitting comprises means for calculating values of the 3DMM parameters based on an unconstrained energy minimization process to match the reference facial image to the fitted 3D reference face, and to match the target facial image to the fitted 3D target face.

Example 28 includes the subject matter of any of Examples 25-27, wherein the texture map generation further comprises means for removing illumination from the reference facial image based on the illumination parameter of the first 3DMM.

Example 29 includes the subject matter of any of Examples 25-28, further comprising means for filling in occluded regions of the texture map using a Poisson image editing process.

Example 30 includes the subject matter of any of Examples 25-29, wherein the region of interest determination is based on a graph cut boundary optimization process.

Example 31 includes the subject matter of any of Examples 25-30, wherein the blending is based on a gradient domain fusion process.

Example 32 includes the subject matter of any of Examples 25-31, further comprising means for providing the replaced facial image to at least one of a digital photography application, personalized avatar creation tool, a privacy protection application, an entertainment application, and a virtual reality application.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for facial image replacement, the method comprising:
    fitting, by a processor-based system, a reference facial image to a first 3-dimensional morphable model (3DMM) to generate a fitted 3D reference face, wherein the first 3DMM includes parameters representing 3D shape data, illumination, and pose, the 3D shape data of the first 3DMM associated with a map of normal vectors to the surface of the fitted 3D reference face;
    fitting, by the processor-based system, a target facial image to a second 3DMM to generate a fitted 3D target face;
    generating, by the processor-based system, a texture map based on the fitted 3D reference face;
    rendering, by the processor-based system, the fitted 3D reference face to a pose of the fitted 3D target face, the rendering based on the parameters of the first 3DMM, the parameters of the second 3DMM, and the generated texture map associated with the fitted 3D reference face;
    determining, by the processor-based system, a region of interest of the target facial image; and
    blending, by the processor-based system, the rendered 3D reference face onto the region of interest of the target facial image to generate a replaced facial image.

2. The method of claim 1, wherein the 3DMM further includes albedo parameters and perspective camera model parameters.

3. The method of claim 1, wherein the fitting comprises calculating values of the 3DMM parameters based on an unconstrained energy minimization process to match the reference facial image to the fitted 3D reference face, and to match the target facial image to the fitted 3D target face.

4. The method of claim 1, wherein the texture map generation further comprises: removing illumination from the reference facial image based on the illumination parameter of the first 3DMM; and/or filling in occluded regions of the texture map using a Poisson image editing process.

5. The method of claim 1, wherein the region of interest determination is based on a graph cut boundary optimization process.

6. The method of claim 1, wherein the blending is based on a gradient domain fusion process.

7. The method of claim 1, further comprising providing the replaced facial image to at least one of a digital photography application, personalized avatar creation tool, a privacy protection application, an entertainment application, and a virtual reality application.

8. A system for facial image replacement, the system comprising:
    a 3-dimensional morphable model (3DMM) fitting circuit to fit a reference facial image to a first 3-dimensional morphable model (3DMM) to generate a fitted 3D reference face, wherein the first 3DMM includes parameters representing 3D shape data, illumination, and pose, the 3D shape data of the first 3DMM associated with a map of normal vectors to the surface of the fitted 3D reference face, the 3DMM fitting circuit further to fit a target facial image to a second 3DMM to generate a fitted 3D target face;
    a texture map generation circuit to generate a texture map based on the fitted 3D reference face;
    an image rendering circuit to render the fitted 3D reference face to a pose of the fitted 3D target face, the rendering based on the parameters of the first 3DMM, the parameters of the second 3DMM, and the generated texture map associated with the fitted 3D reference face; and
    an image blending circuit to blend the rendered 3D reference face onto a determined region of interest of the target facial image to generate a replaced facial image.

9. The system of claim 8, wherein the 3DMM further includes albedo parameters and perspective camera model parameters.

10. The system of claim 8, wherein the 3DMM fitting circuit is further to calculate values of the 3DMM parameters based on an unconstrained energy minimization process to match the reference facial image to the fitted 3D reference face, and to match the target facial image to the fitted 3D target face.

11. The system of claim 8, wherein the texture map generation circuit is further to: remove illumination from the reference facial image based on the illumination parameter of the first 3DMM; and/or fill in occluded regions of the texture map using a Poisson image editing process.

12. The system of claim 8, wherein the image blending circuit is further to: determine the region of interest based on a graph cut boundary optimization process; and/or employ a gradient domain fusion process to perform the blending.

13. At least one non-transitory computer readable storage medium having instructions encoded thereon that, when executed by one or more processors, result in the following operations for facial image replacement, the operations comprising:
fitting a reference facial image to a first 3-dimensional morphable model (3DMM) to generate a fitted 3D reference face, wherein the first 3DMM includes parameters representing 3D shape data, illumination, and pose, the 3D shape data of the first 3DMM associated with a map of normal vectors to the surface of the fitted 3D reference face;
fitting a target facial image to a second 3DMM to generate a fitted 3D target face;
generating a texture map based on the fitted 3D reference face;
rendering the fitted 3D reference face to a pose of the fitted 3D target face, the rendering based on the parameters of the first 3DMM, the parameters of the second 3DMM, and the generated texture map associated with the fitted 3D reference face;
determining a region of interest of the target facial image; and
blending the rendered 3D reference face onto the region of interest of the target facial image to generate a replaced facial image.

14. The non-transitory computer readable storage medium of claim 13, wherein the 3DMM further includes albedo parameters and perspective camera model parameters.

15. The non-transitory computer readable storage medium of claim 13, wherein fitting comprises calculating values of the 3DMM parameters based on an unconstrained energy minimization process to match the reference facial image to the fitted 3D reference face, and to match the target facial image to the fitted 3D target face.

16. The non-transitory computer readable storage medium of claim 13, wherein generating the texture map comprises removing illumination from the reference facial image based on the illumination parameter of the first 3DMM.

17. The non-transitory computer readable storage medium of claim 13, the operations further comprising filling in occluded regions of the texture map using a Poisson image editing process.

18. The non-transitory computer readable storage medium of claim 13, wherein the region of interest determination is based on a graph cut boundary optimization process.

19. The non-transitory computer readable storage medium of claim 13, wherein the blending is based on a gradient domain fusion process.

20. The non-transitory computer readable storage medium of claim 13, the operations further comprising providing the replaced facial image to at least one of a digital photography application, a privacy protection application, an entertainment application, and a virtual reality application.

\* \* \* \* \*